United States Patent
Carlsgaard et al.

(10) Patent No.: US 7,860,375 B2
(45) Date of Patent: *Dec. 28, 2010

(54) METHOD AND APPARATUS FOR SIMULTANEOUS RECORDING AND DISPLAYING TWO DIFFERENT VIDEO PROGRAMS

(75) Inventors: Eric Stephen Carlsgaard, Zionsville, IN (US); Thomas Edward Horlander, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1320 days.

This patent is subject to a terminal disclaimer.

(21) Appl. No.: 10/204,729

(22) PCT Filed: Mar. 8, 2001

(86) PCT No.: PCT/US01/07454

§ 371 (c)(1),
(2), (4) Date: Aug. 22, 2002

(87) PCT Pub. No.: WO01/72035

PCT Pub. Date: Sep. 27, 2001

(65) Prior Publication Data

US 2003/0223731 A1 Dec. 4, 2003

Related U.S. Application Data

(60) Provisional application No. 60/190,417, filed on Mar. 17, 2000.

(51) Int. Cl.
*H04N 5/932* (2006.01)
*H04N 9/80* (2006.01)
*H04N 5/84* (2006.01)
*H04N 5/928* (2006.01)
*H04N 5/50* (2006.01)
*H04N 5/445* (2006.01)

(52) U.S. Cl. .............. 386/201; 386/239; 386/332; 386/336; 348/564; 348/565

(58) Field of Classification Search ........... 348/564, 348/565, 555; 386/1, 46, 95, 125–126, 201, 386/239, 336, 332
See application file for complete search history.

(56) References Cited

U.S. PATENT DOCUMENTS 5,477,397 A * 12/1995 Naimpally et al. .......... 386/123

(Continued)

FOREIGN PATENT DOCUMENTS

EP    0847197    6/1998

(Continued)

*Primary Examiner*—Thai Tran
*Assistant Examiner*—Daquan Zhao
(74) *Attorney, Agent, or Firm*—Robert D. Shedd; Joseph J. Opalach; Catherine A. Cooper

(57) ABSTRACT

A method and apparatus for simultaneously recording and displaying video signals from two different video sources. The apparatus comprises a main channel processing circuit, a second channel processing circuit, and common circuitry. The common circuit comprises a digital video decoder pipe that decodes both first and second encoded video signals. A PIP picture is produced using a common reference clock that is derived from the first video signal. In a record mode, a second channel clock reference is coupled to the second channel processing circuit to produce a recordable signal using a digital encoder. The recordable signal also forms a PIP picture that is coupled to the main channel processing circuit to produce a PIP picture that is used to monitor the recording process.

12 Claims, 3 Drawing Sheets

U.S. PATENT DOCUMENTS

| | | | |
|---|---|---|---|
| 5,481,543 A * | 1/1996 | Veltman | 370/473 |
| 5,559,562 A | 9/1996 | Ferster | 348/584 |
| 5,598,222 A | 1/1997 | Lane | 348/568 |
| 5,787,223 A * | 7/1998 | Faryar et al. | 386/46 |
| 5,847,771 A * | 12/1998 | Cloutier et al. | 348/564 |
| 5,969,768 A | 10/1999 | Boyce et al. | 348/565 |
| 6,025,884 A | 2/2000 | Choi | 348/565 |
| 6,141,062 A * | 10/2000 | Hall et al. | 348/584 |
| 6,285,408 B1 * | 9/2001 | Choi et al. | 348/555 |
| 6,333,731 B1 | 12/2001 | Baek | |
| 2001/0007576 A1 | 7/2001 | Lyu | 375/240.25 |

FOREIGN PATENT DOCUMENTS

| | | |
|---|---|---|
| JP | 10023375 A | 1/1998 |
| JP | 10136282 A | 5/1998 |
| JP | 10308945 A | 11/1998 |
| JP | 2000175116 A | 6/2000 |

* cited by examiner

| COMBINATIONS | V PIXELS | INT/PROG | TOTAL LINES | V BLANKING (µs) | H FREQ (KHz) | PIXEL FREQ (MHz) | H PIXELS | H ACTIVE | H BLANKING (µs) | H PERIOD (µs) | H TOT (STD) | H BLK (STD) (µs) | |
|---|---|---|---|---|---|---|---|---|---|---|---|---|---|
| MAIN-60 | 1080 | INT | 1125.0 | 667 | 33.75 | 81 | 2400 | 1920 | 5.93 | 29.63 | 2200 | 3.46 | 16X9 |
| RECORD-59.94 | 480 | INT | 525.0 | 1430 | 15.73425 | 13.4999865 | 858 | 720 | 10.22 | 63.56 | 858 | 10.22 | 4X3 |
| MAIN-60 | 1080 | INT | 1125.0 | 667 | 33.75 | 81 | 2400 | 1920 | 5.93 | 29.63 | 2200 | 3.46 | 16X9 |
| RECORD-60 | 480 | INT | 525.0 | 1430 | 15.75 | 13.5135 | 858 | 720 | 10.21 | 63.49 | 858 | 10.21 | 4X3 |
| MAIN-59.94 | 1080 | INT | 1125.0 | 667 | 33.71625 | 80.919 | 2400 | 1920 | 5.93 | 29.66 | 2200 | 3.46 | 16X9 |
| RECORD-59.94 | 480 | INT | 525.0 | 1430 | 15.73425 | 13.4999865 | 858 | 720 | 10.22 | 63.56 | 858 | 10.22 | 4X3 |
| MAIN-59.94 | 1080 | INT | 1125.0 | 667 | 33.71625 | 80.919 | 2400 | 1920 | 5.93 | 29.66 | 2200 | 3.46 | 16X9 |
| RECORD-60 | 480 | INT | 525.0 | 1430 | 15.75 | 13.5135 | 858 | 720 | 10.21 | 63.49 | 858 | 10.21 | 4X3 |

FIG. 3

# METHOD AND APPARATUS FOR SIMULTANEOUS RECORDING AND DISPLAYING TWO DIFFERENT VIDEO PROGRAMS

This application claims the benefit under 35 U.S.C. §365 of International Application PCT/US01/07454, filed Mar. 8, 2001, which was published in accordance with PCT Article 21(2) on Sep. 27, 2001 in English; and which claims benefit of U.S. provisional application Ser. No. 60/190,417 filed Mar. 17, 2000.

BACKGROUND OF THE DISCLOSURE

1. Field of the Invention

The invention relates to signal processing techniques for simultaneously recording and displaying two video programs.

2. Description of the Background Art

Television viewers have come to desire simultaneously recording and viewing programs from two different video sources, e.g., a satellite television program and a standard terrestrial broadcast program. However, various video sources produce video signals that have different horizontal and vertical synchronization rates. As such, two separate video decoder and display generation systems are needed to facilitate viewing one program, while producing an output signal of another program that can be recorded as a baseband video output as well as viewed in a picture-in-picture (PIP) display (by inserting that baseband video signal into a standard PIP circuit). Such a system requires the hardware of two television receivers.

Therefore, a need exists for a video processing apparatus having a single video decoder system that is capable of displaying a main picture from a first video signal plus producing a recordable signal from a second video signal as well as producing a PIP picture for monitoring the recordable signal.

SUMMARY OF THE INVENTION

The disadvantages associated with the prior systems are overcome by a method and apparatus for simultaneously recording and displaying video signals from two different video sources. The apparatus comprises a main channel processing circuit, a second channel processing circuit, and common circuitry. The common circuitry comprises a digital video decoder pipe that decodes both first and second encoded video signals. The main channel processing circuit processes the decoded first video signal to form a main picture for display. The second channel processing circuit processes the decoded second video signal to form a PIP picture for combination with the main picture for display. The PIP picture is produced using a common reference clock that is derived from the first video signal. In a record mode, a second channel clock reference is coupled to the second channel processing circuit to produce a recordable signal using a digital encoder. The recordable signal also forms a PIP picture that is coupled to the main channel processing circuit to produce a PIP picture that is used to monitor the recording process.

BRIEF DESCRIPTION OF THE DRAWINGS

FIG. 3 is a table of illustrative signal formats that can be processed by the present invention.

Identical reference numerals have been used, where possible, to designate identical elements that are common to the figures.

DETAILED DESCRIPTION

Figure 1:
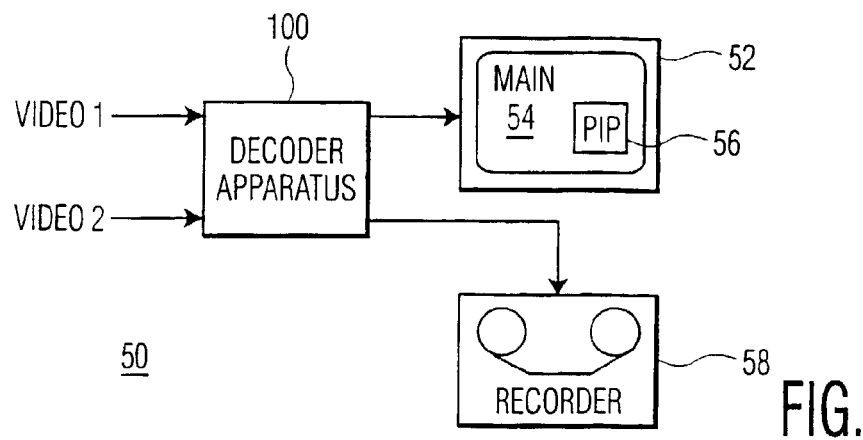
FIG. 1 depicts a block diagram of a video decoder system in accordance with the present invention.

FIG. 1 depicts a block diagram of a video decoder system 50 for decoding a plurality of video signals from different video sources. The illustrative embodiment decodes a pair of encoded video signals (video 1 and video 2) that are coupled to the system 50. The system 50 uses decoders that process a pair of signals that have been encoded using for example the Moving Pictures Expert Group (MPEG) standard. These signals are received by the video decoder system 50 from any of a satellite television receiver, a high definition television (HDTV) receiver, digital cable receiver, video cassette recorder (VCR) and the like.

Figure 1A:
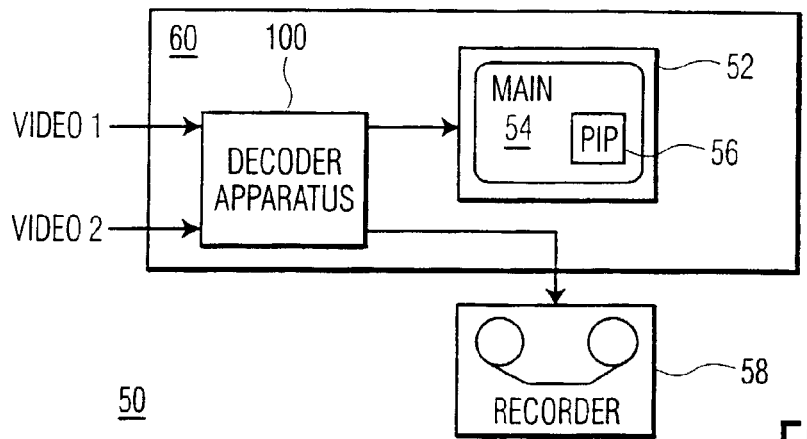
FIG. 1a depicts a block diagram of a video decoder system in accordance with the present invention including the decoder apparatus contained within a television receiver.
Figure 1B:
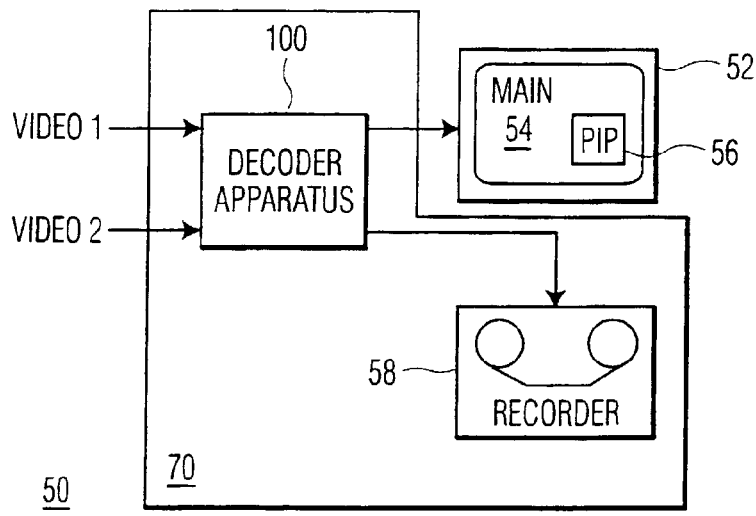
FIG. 1b depicts a block diagram of a video decoder system in accordance with the present invention including the decoder apparatus contained within a video processing device.

The system 50 comprises a decoder apparatus 100, a display 52 (e.g., a television) and a video processing device 58 (e.g., a video cassette recorder). The decoder apparatus 100 receives and decodes both video signals, video 1 and video 2, using common decoding and timing circuitry to produce a signal for a main picture 54 (e.g., from video 1) and a signal for recording on the video processing device 58 as well as display in a PIP picture 56 (e.g., from video 2). The decoder apparatus 100 may be a stand alone apparatus. Alternatively, the decoder apparatus 100 may be integrally contained within any of a satellite television receiver, a high definition television (HDTV) receiver, digital cable receiver, video cassette recorder (VCR) and the like. FIG. 1a illustrates the decoder apparatus 100 contained within a television receiver 60. FIG. 1b illustrates the decoder apparatus 100 contained within a video processing device 70. As such, the system 50 simultaneously produces a video signal for display and for recording. Thus, the system 50 is capable of monitoring the recordable signal in a PIP picture 56. By using common circuitry to process two video signals, the decoder apparatus 100 is less expensive to manufacture than prior decoder apparatuses.

Figure 2:
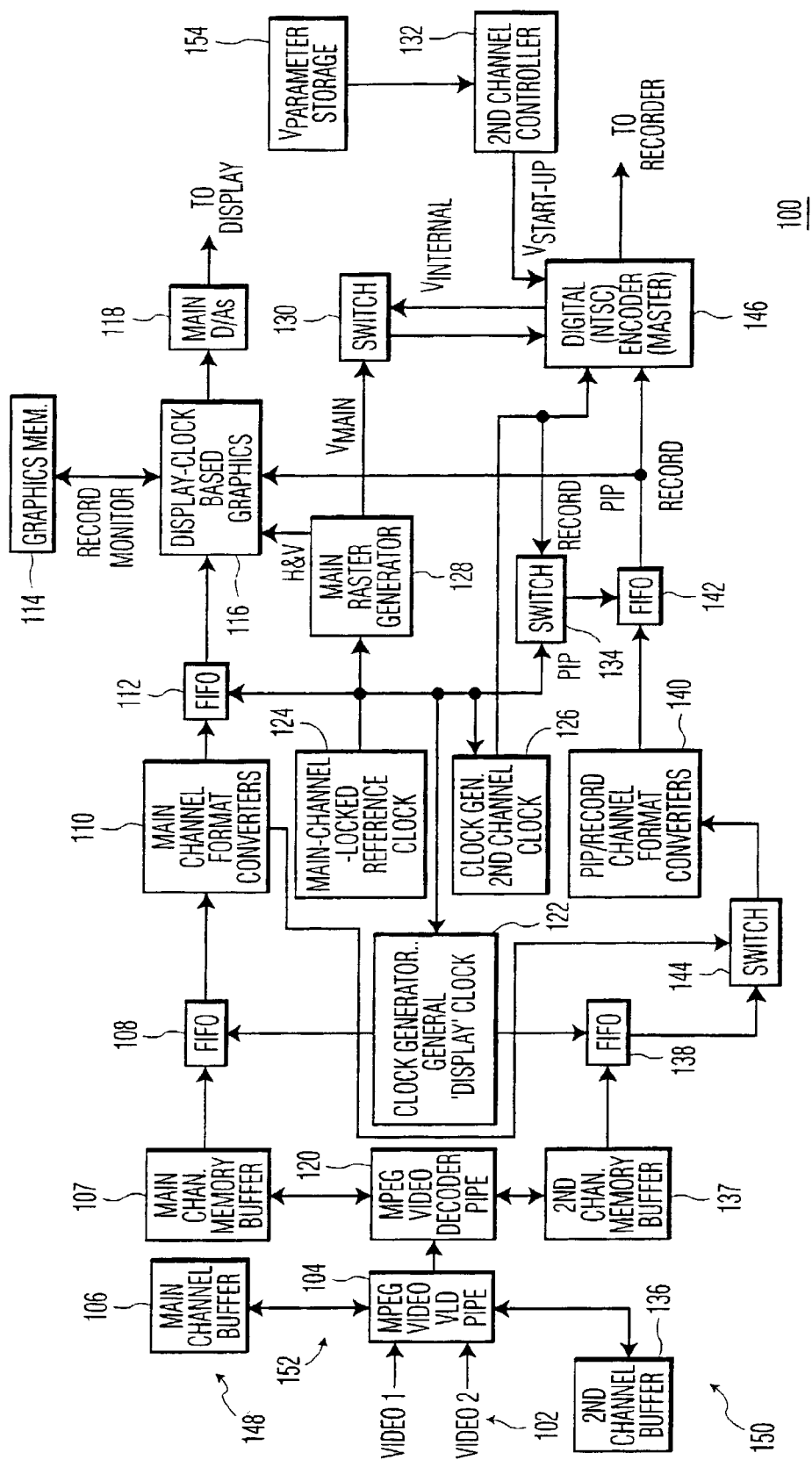
FIG. 2 depicts a detailed block diagram of a video decoder apparatus in accordance with the present invention.

FIG. 2 depicts a detailed block diagram of decoder apparatus 100 of FIG. 1. Apparatus 100 comprises a main channel processing circuit 148, a second channel processing circuit 150, and common circuitry 152.

Both video signals (video 1 and video 2) are received as compressed data by the decoder apparatus simultaneously and independently of one another. The main compressed data is received by a main channel memory buffer 106 and the second channel compressed data is received by a second channel memory buffer 136. The main compressed data and second channel compressed data are provided to an MPEG Video Variable Length Decoder (VLD) Pipe 104 which decodes the variable length coding of the main and second channel compressed data and feeds the decoded data signal streams to a common MPEG Video Decoder Pipe 120. Using an interleaving process, the pipe 120 decodes both of the video signals and provides the decoded main channel video frames to the main channel memory buffer 106 and the decoded second channel video frames to the second channel memory buffer 136. Since the MPEG video decoder pipe 120 is shared by the two video signals, the faster of the two decode rates is used to decode both of the signals, i.e., a 60 Hz decode rate is used over a 59.94 Hz decode rate. If both video signals have the same decode rate, then, of course, the pipe 120 uses the decode rate of the two signals. In the case where the decode rates are different, the slower input video stream is processed faster than necessary. As such, the decoding process for the slower stream will occasionally stop to ensure that a data underflow condition will not occur in the main channel memory buffer 106 or second channel memory buffer 136.

The buffer 106 and the buffer 136 are coupled to respective first in, first out (FIFO) memories 108 and 138. The access (read and write) process of both of the FIFO buffers 108 and 138 is controlled by a single clock generator 122. The clock generator 122 produces a clock signal derived from a clock signal produced by a reference clock generator 124. The clock signal is provided to each FIFO buffer 108 and 138 by the clock generator 122. The clock signal produced by the reference clock generator 124 is locked to the main channel timing signal.

FIFO 108 is coupled to the main channel format converter 110. FIFO 138 is coupled to second channel format converter 140. The clock signal produced by the clock generator 122 is also coupled to the main and second channel format converters 110 and 140. Since the format of the input video signals is arbitrary it must be determined if the input video signals are either field pictures or frame pictures. If the pictures are frame pictures, processing of the picture can not begin until at least half of the frame picture plus one macroblock row of the picture is decoded and available in FIFO 108 or 138. While the bottom half of the frame picture is being decoded, format conversion may be started on the top half of the picture. Regardless of the interleaving order between video 1 and video 2 decoding and also regardless of the decode rate chosen, the last line of the bottom half of the picture must complete decoding in time to be used by the format converters 110 and 140. To ensure this condition under every circumstance, it may be necessary to have more than half of the frame picture plus one macroblock row decoded and in memory before starting format conversion. The format converters 110 and 140 consist of horizontal and vertical sample rate converters, also known as digital filters. The output of each converter 110 and 140 is coupled to a respective FIFO memory 112 and 142. These FIFOs 112 and 142 each buffer the video frames to ensure that the frames are synchronized with the display timing signals. Access to FIFOs 112 and 142 are controlled by the clock signal from the reference clock generator 124.

The reference clock signal from the reference clock generator 124 is also coupled to the main raster generator 128. The generator 128 produces horizontal (H) and vertical (V) synchronization signals that facilitate display of the main picture onto a display such as a cathode ray tube or liquid crystal display. The H and V signals are coupled to the display generator 116 for controlling the raster scan of the pixel data. Additionally, the display generator 116 produces on screen graphics that can be recalled from a graphics memory 114 and controls the insertion of the PIP picture into the main picture. The display, comprising on-screen graphics, PIP picture and main picture, is coupled to main digital-to-analog converters (DACs) 118 that produce an analog display for viewing on a television screen.

The PIP picture is generated from FIFO 142 using a clock signal produced by the reference clock generator 124 that is routed through switch 134. The PIP picture is coupled to the graphics generator 116 for display within the main picture.

When a recording is to be made of the second channel video signal, a second channel clock generator 126 produces a clock signal for second channel signal timing. This generator 126 uses the reference clock signal from the reference clock generator 124 as a reference signal for deriving the second channel clock signal because the record output uses NTSC timing while the main, in some cases, uses ATSC (HDTV) timing. Deriving the second channel clock from the reference clock eliminates the need for a second channel clock recovery circuit. Within a small range of tolerance, the first clock and second clock have a frequency of 81 MHz, 13.5 MHz, 80.919 MHZ or 13.5135 MHz. These frequencies are all related to each other by a factor of 6 and/or a factor of 1000/1001. By providing the ability to scale the recovered first channel clock by one or both of these factors, the second channel clock can be derived within 2× the tolerance of the first channel reference clock. If necessary, the accuracy of the second channel clock can be further refined by monitoring the decoded video buffer level. The second channel clock is coupled through switch 134 to the FIFO 142 and is coupled to the digital encoder 146, i.e., an NTSC encoder, for converting the digital television signal into a standard analog NTSC signal for recording. When in a record mode, switch 134 couples the video frames from the output of FIFO 142 to digital encoder 146.

To facilitate digital encoding, the parameters that define the vertical synchronization of the video signal are required. The parameters for the available second channel signals are stored in vertical parameter storage 154. These parameters are coupled to the digital encoder 146 through the second channel encoder controller 132. This controller produces a vertical start up ($V_{start-up}$) signal that is appropriate for the type of second channel signal being processed. $V_{main}$ and $V_{internal}$ are coupled to the digital encoder 146 through switch 130. $V_{main}$ is used if the main channel video is selected for the digital encoder 146, and $V_{internal}$ is used if the PIP channel is selected for the digital encoder 146. Once the vertical start up signal is received by the digital encoder 146, the digital encoder 146 produces an internally generated vertical synchronization signal.

In the record mode, the apparatus 100 uses two clock signals: one for main picture generation and one for generating the recordable signal. In this mode, the video frames of the recordable signal are coupled to the graphics generator such that the frames are captured for display as a PIP picture. However, since the timing for producing the recordable signal is not correct for producing the main picture, the main and PIP frames are not synchronized. As such, PIP pictures may be repeated or dropped, as appropriate, to achieve a PIP picture. However, dropping or repeating frames in the PIP picture is typically not noticeable to a viewer.

Since there is only one reference clock generator, a voltage controlled crystal oscillator (VCXO), that produces a reference clock based upon the decoded video, the second channel clock is based upon the reference clock. However, the clock signal produced by the second channel clock generator is varied depending upon the type of second channel signal being received. The reference clock is recovered during transport layer processing and is based on a 27 MHz reference clock. Each possible raster timing clock is derived from the recovered 27 MHz reference clock.

FIG. 3 depicts a chart of various clock frequencies that are produced by the main channel reference clock generator and the second channel reference clock generator to facilitate decoding of different types of video signal formats.

The apparatus inventively uses the second channel processing circuit to produce both a recordable signal as well as a PIP picture. Also, a number of decoding and timing circuits are shared by both the main and second channel processing circuits. Additionally, common memory space can be used for PIP and recordable signal frame buffers. Consequently, the second channel, main and graphics signals may share a common memory integrated circuit. Such a decoder apparatus design is cost effective.

The invention claimed is:

1. A method of simultaneously recording and viewing a plurality of video signals comprising the steps of:
   (a) decoding, using a first clock reference signal, a first video signal from a first video source in a common shared video decoder pipe;
   (b) decoding, using said first clock reference signal, a second video signal from a second video source in the common shared video decoder pipe when said first and second video signals are to be displayed as a main picture and a picture in picture (PIP) picture;
   c) encoding, using a second clock reference signal, said second video signal when said first video signal is to be displayed and said second video signal is to be recorded.

2. The method of claim 1 wherein said step (c) further comprises displaying said second video signal while recording said second video signal, as a PIP picture.

3. The method of claim 1 wherein said video decoder pipe decodes moving pictures expert group (MPEG) encoded video signals.

4. The method of claim 1 wherein the second clock reference signal is derived from the first clock reference signal.

5. The method of claim 1, wherein said first video signal and said second video signal have different decoding rates and a clock of one of said first video signal and said second a video signal having the faster decode rate is used as the first clock reference signal.

6. Apparatus for simultaneously recording and displaying a plurality of video signals comprising:
   a common shared video decoder pipe for decoding said plurality of video signals from different video sources using a first clock reference signal;
   a main channel processing circuit, coupled to said common shared video decoder pipe, for producing a main picture from a first of said plurality of video signals for display;
   a second channel processing circuit, coupled to said common shared video decoder pipe, for producing a decoded video signal from a second of said plurality of video signals for PIP display and for encoding said second of said plurality of video signals using a second clock reference signal for recording.

7. The apparatus of claim 6 further comprising:
   a reference clock generator coupled to said main channel processing circuit and said second channel processing circuit; and
   a channel clock generator coupled to said second channel processing circuit.

8. The apparatus of claim 7 wherein said second channel clock generator derives a channel clock signal from a reference clock signal generated by said reference clock generator.

9. The apparatus of claim 6 wherein said second channel processing circuit comprises a digital encoder for producing an analog signal for recording.

10. The apparatus of claim 9 wherein said digital encoder produces an internal vertical synchronization signal.

11. The apparatus of claim 6, wherein said apparatus is contained within a video receiver.

12. The apparatus of claim 6, wherein said apparatus is contained within a video processing device.

* * * * *